Patented May 12, 1936

2,040,804

UNITED STATES PATENT OFFICE 2,040,804

RECOVERY OF BERYLLIUM

John E. Bucher, Fort Lee, N. J., assignor to Antioch Industrial Research Institute, Inc., Yellow Springs, Ohio, a corporation of Ohio No Drawing. Application April 28, 1933,
Serial No. 668,385

13 Claims. (Cl. 75—108)

This invention relates to the recovery of beryllium, more especially finely divided beryllium, from beryllium chloride, $BeCl_2$. The metallic beryllium is recovered in the form of very finely divided particles frequently called "spangles" or "leaflets". The metal in this form is often called "sponge" or referred to as being "comminuted."

Heretofore, attempts to recover beryllium from its ores by making beryllium chloride and treating it to recover metallic beryllium have been so expensive and given so much trouble that no commercially satisfactory or sufficiently economical process for this purpose has been developed.

One of the troubles in prior processes has been due to the fact that both acids and alkalies attack or dissolve beryllium, so that the recovered beryllium is so contaminated with oxide that it is practically useless, and the oxide is often present in such quantity as to make it impossible to fuse the particles together. It has been found that unless the beryllium powder resulting from the prior processes contains at least 80 per cent beryllium, it cannot be fused to a coherent mass even if a hydrogen atmosphere is used with the metal powder briquetted before fusing. Other impurities besides the oxide are often found in the recovered beryllium so that the product is practically useless. It has been known for a long time that beryllium chloride could be obtained from beryllium ores and that metallic beryllium could be obtained from the chloride by treatment with alkali metals or alkaline earth metals such as sodium, potassium, magnesium, etc. However, when the product resulting from the action of sodium or potassium or the like upon beryllium chloride or beryllium chloride mixed or combined with alkali halides, such as NaCl, KCl, NaF, KF, etc., was treated with water, the beryllium metal which was always in the form of small particles or spangles remained suspended and circulated in the aqueous salt solution for a long time instead of settling promptly. This suspension and agitation appears to be due to the formation of beryllium hydroxide, which is colloidal, so that the very small spangles could not readily settle to the bottom under the influence of gravity. It is also very likely that the spangles are surrounded more or less completely by an envelope of colloidal beryllium hydroxide, formed by the conversion of part of the metal into hydroxide, which also kept the particles from settling promptly. The suspended metal particles are attacked by either acids or alkalies with the evolution of hydrogen, which, attached to the metal spangles or enmeshed in their surrounding colloid envelope, causes them to rise and fall and circulate like tiny balloons so that effective separation of metal is very greatly retarded or even made impossible.

Also when the beryllium chloride is in excess of the amount required to react quantitatively with the sodium or potassium, etc. there is a very serious and persistent evolution of hydrogen and corresponding loss of metal both because some of it is dissolved and because of the tendency for colloids to be formed by the dissociating action of water upon beryllium chloride. When the sodium or potassium is in the exact sufficient amount to react with all of the beryllium chloride, this effect is largely avoided. When the sodium or potassium is in slight excess, resulting in the formation of sodium or potassium hydroxide in the solution the deleterious action is apparently much less than when the beryllium chloride is in excess. However, even when some excess sodium or potassium is used, there is usually a brisk evolution of hydrogen, which may result from the action of alkali metal upon water. This may cease in a short while, but there is enough colloid formed to prevent the smaller spangles from settling out except after a very long time. The metallic beryllium therefore becomes so contaminated with colloid as to be practically useless. Upon heating the spangles the beryllium becomes badly contaminated with oxide from the colloid.

By the present invention, troubles heretofore encountered may be avoided by the addition of compounds to the aqueous salt solution from which the spangles settle. The added compounds appear to have the effect of dissolving beryllium hydroxide colloid and at the same time do not seriously attack the metallic beryllium. I have found that alkali salts of weak acids such as ammonium, sodium and potassium salts of carbonic and carbamic acids, for example, are suitable for this purpose. When the solution is heated slightly the action upon the beryllium hydroxide colloid is increased or quickened. Ammonium carbonate, bicarbonate and carbamate have thus far been found to be the most useful. Ammonium carbonate, bicarbonate and carbamate, for example, also have the effect of producing sodium carbonate and ammonium hydroxide by interaction with any sodium hydroxide which may be present, thus decreasing the alkalinity of the solution.

When one or more of the mentioned salts of weak acids, such as ammonium carbonate or ammonium carbamate, for example, is added to the aqueous salt solution containing beryllium spangles and colloids and the solution is preferably slightly warmed, the colloid is dissolved and the spangles promptly settle out of the liquid. The berryllium can then be easily recovered as by decantation or filtering. The beryllium spangles may then be washed with water. There is danger of the spangles becoming oxidized when air and water are present. To avoid this danger the spangles may be filtered in an atmosphere of inert gas such as hydrogen or nitrogen. Or the spangles may be finally washed with alcohol or with alcohol followed by benzene so as to replace the water by a liquid that is completely inactive with the beryllium. After being used, the ammonium carbonate solution, upon heating, precipitates basic beryllium carbonate and both ammonia and carbon dioxide can be recovered, so that this part of the process is cyclic.

In carrying out this process there is sometimes a delay in the settling of the spangles due to attachment or enmeshing of gas bubbles in, or to, the small particles of beryllium spangles. The gases may be hydrogen that is liberated by decomposition of water by beryllium or sodium, or may be air or carbon dioxide dissolved in the water that is used as a solvent for the salts. However these bubbles originate, whether they be large and easily visible or small and invisible, they delay the time of settling of small beryllium particles or they may entirely prevent some of the very fine particles from settling. Such delay in settling gives time for destructive or injurious reactions to take place to such an extent that the product may be seriously injured.

The troubles from slow settling, because of the presence of gas bubbles, may be very effectively avoided by exhausting the mass of liquid containing the suspended or floating beryllium particles with a good vacuum pump. This requires only a very short time as the gas bubbles expand greatly and the water will immediately begin to boil violently even at room temperature. This water vapor at once washes out the troublesome gases, and, upon releasing the vacuum, water is driven into the spaces previously occupied by the buoying gases. Thereupon the metallic beryllium particles settle promptly to the bottom of the solution. If any turbid or colloidal impurities are present in the solution they do not settle with the metallic particles. By decanting the turbid supernatant liquid from the metal particles, a very helpful separation is obtained.

The beryllium particles or spangles obtained in this way appear as a power showing no oxide under the magnifying glass. When it is heated with copper powder in a glass tube in hydrogen, it is partially sintered, and this loosely sintered mass gives a globule of rich copper alloy at once when it is dropped into molten sodium chloride with no beryllium particles floating in the bath. It is a substantially quantitative conversion of beryllium powder into alloy. The beryllium powder may be melted into beryllium ingots, as it is known that clean beryllium fuses to globules in a magnesia tube.

The beryllium thus obtained may also be briquetted under pressure alone, or with copper or other metals capable of alloying with it and then fused in hydrogen alone or with powdered salt in a hydrogen atmosphere to obtain the metal or alloy in coherent form.

I claim:

1. The process of preparing metallic beryllium which comprises adding an alkali salt of a weak acid which dissolves beryllium hydroxide and does not affect metallic beryllium to an aqueous solution containing beryllium hydroxide and fine particles of beryllium.

2. The process of preparing metallic beryllium which comprises adding an alkali salt of a weak acid which dissolves beryllium hydroxide and does not affect metallic beryllium to an aqueous alkali halide solution containing beryllium hydroxide and fine particles of beryllium.

3. The process of preparing metallic beryllium which comprises adding an alkali salt of carbonic acid to an aqueous solution containing beryllium hydroxide and fine particles of beryllium.

4. The process of preparing metallic beryllium which comprises adding ammonium carbonate to an aqueous solution containing beryllium hydroxide and fine particles of beryllium.

5. The process of preparing metallic beryllium which comprises treating beryllium chloride with an alkali metal, forming an aqueous solution, and adding an alkali salt of a weak acid which dissolves beryllium hydroxide and does not affect metallic beryllium.

6. The process of preparing metallic beryllium which comprises treating beryllium chloride with an alkali metal, forming an aqueous solution, and adding ammonium carbonate.

7. The process of preparing metallic beryllium which comprises adding to an aqueous alkali halide solution containing particles of metallic beryllium and beryllium hydroxide in suspension a compound which causes said hydroxide to become dissolved and does not affect the metallic beryllium.

8. The process of preparing metallic beryllium which comprises adding to an aqueous alkali halide solution containing particles of metallic beryllium and beryllium hydroxide in suspension an alkali salt of a weak acid which dissolves beryllium hydroxide and does not affect the metallic beryllium.

9. The process of preparing metallic beryllium which comprises adding ammonium carbonate to an aqueous alkali halide solution containing particles of metallic beryllium and beryllium hydroxide.

10. The process of preparing metallic beryllium which comprises adding to an aqueous alkali halide solution containing particles of metallic beryllium and beryllium hydroxide in suspension a compound which causes said hydroxide to become dissolved and does not affect the metallic beryllium and applying a vacuum.

11. The process of preparing metallic beryllium which comprises adding to an aqueous alkali halide solution containing particles of metallic beryllium and beryllium hydroxide in suspension a compound which causes said hydroxide to become dissolved and does not affect the metallic beryllium and applying heat and a vacuum.

12. The process of preparing metallic beryllium which comprises adding ammonium carbamate to an aqueous solution containing beryllium hydroxide and fine particles of beryllium.

13. The process of preparing metallic beryllium which comprises adding sodium carbonate to an aqueous solution containing beryllium hydroxide and fine particles of beryllium.

JOHN E. BUCHER.